US009519372B2

United States Patent
Dong et al.

(10) Patent No.: US 9,519,372 B2
(45) Date of Patent: Dec. 13, 2016

(54) GATE DRIVING CIRCUIT FOR TIME DIVISION DRIVING, METHOD THEREOF AND DISPLAY APPARATUS HAVING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Xiangdan Dong, Beijing (CN); Young Yik Ko, Beijing (CN); Weiyun Huang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/369,525

(22) PCT Filed: Dec. 16, 2013

(86) PCT No.: PCT/CN2013/089607
§ 371 (c)(1),
(2) Date: Jun. 27, 2014

(87) PCT Pub. No.: WO2015/043087
PCT Pub. Date: Apr. 2, 2015

(65) Prior Publication Data
US 2015/0091822 A1   Apr. 2, 2015

(30) Foreign Application Priority Data

Sep. 29, 2013   (CN) .......................... 2013 1 0456249

(51) Int. Cl.
*G06F 3/041*   (2006.01)

(52) U.S. Cl.
CPC ................................ *G06F 3/0416* (2013.01)

(58) Field of Classification Search
CPC ............................................. G09G 2310/0202
(Continued)

(56) References Cited

U.S. PATENT DOCUMENTS 8,736,544 B2 *   5/2014   Shimoshikiryoh .. G09G 3/3614
345/103
2002/0027545 A1 *   3/2002   Park ..................... G09G 3/3685
345/98

(Continued)

FOREIGN PATENT DOCUMENTS

CN   102708926 A   10/2012

OTHER PUBLICATIONS

International Search Report Appln. No. PCT.CN2013/089607; Dated Jun. 10, 2014.

(Continued)

*Primary Examiner* — Long D Pham
(74) *Attorney, Agent, or Firm* — Ladas & Parry LLP

(57) ABSTRACT

The present disclosure relates to the field of display technology, and provides a gate driving circuit, a gate line driving method and a display apparatus capable of solving the technical problem of display defects caused by the interrupt of the scan signal in the touch screen technology with time division driving. The gate driving circuit comprises multiple shift register units connected in series, and further comprises a shift delay module and a repeat output module, wherein the shift delay module is connected in series between the $j^{th}$ stage of shift register unit and the $(j+1)^{th}$ stage of shift register unit which are adjacent to each other; the shift delay module is connected to the output terminal of the $j^{th}$ stage of shift register unit and the input terminal of the $(j+1)^{th}$ stage of shift register unit, and the (Continued)

shift delay module is also connected to the repeat output module; the repeat output module is connected to the output terminal of the $(j-n+1)^{th}$ stage of shift register unit and a clock control terminal. Embodiments of the present disclosure can be applied to display manufacture.

20 Claims, 8 Drawing Sheets

(58) Field of Classification Search
 USPC .......................................................... 345/98
 See application file for complete search history.

(56) References Cited

U.S. PATENT DOCUMENTS

| 2006/0159217 A1* | 7/2006 | Harada | G11C 19/00 377/64 |
|---|---|---|---|
| 2008/0204397 A1* | 8/2008 | Jang | G09G 3/3426 345/102 |
| 2013/0314361 A1* | 11/2013 | Saitoh | G06F 3/0412 345/173 |
| 2014/0079173 A1 | 3/2014 | Yan et al. | |

OTHER PUBLICATIONS

International Preliminary Report on Patentability Appln. No. PCT/CN2013/089607; Dated Mar. 29, 2016.

* cited by examiner

GATE DRIVING CIRCUIT FOR TIME DIVISION DRIVING, METHOD THEREOF AND DISPLAY APPARATUS HAVING THE SAME

TECHNICAL FIELD OF THE DISCLOSURE

The present disclosure relates to the field of display technology, and particularly to a gate driving circuit, a gate line driving method and a display apparatus.

BACKGROUND

In the touch screen technology, the display scan can be implemented in a manner of time division driving, that is, the pixel scan is performed in the driving stage, the output of the scan signal is stopped in the touch stage, and the scan signal continues to be output after the end of the touch stage to scan pixels. Since the gate driving circuit as known in the art usually consists of multiple shift register units connected in series, and each shift register unit outputs a driving signal for one gate line correspondingly, in the above procedure of outputting the scan signal, the output interrupt of the scan signal would cause the discontinuity of pictures due to the long touch stage, resulting in display defects of the products.

SUMMARY

Embodiments of the present disclosure provide a gate driving circuit, a gate line driving method and a display apparatus capable of solving the technical problem of display defects caused by the interrupt of the scan signal in the touch screen technology with time division driving.

In order to solve the above technical problem, the following technical solutions are adopted by embodiments of the present disclosure.

In one aspect, there is provided a gate driving circuit comprising multiple shift register units connected in series, a shift delay module is connected in series between the $j^{th}$ stage of shift register unit and the $(j+1)^{th}$ stage of shift register unit which are adjacent to each other;
  wherein the shift delay module is connected to the output terminal of the $j^{th}$ stage of shift register unit and the input terminal of the $(j+1)^{th}$ stage of shift register unit, and the shift delay module is also connected to a repeat output module;
  the repeat output module is connected to the output terminal of the $(j-n+1)^{th}$ stage of shift register unit and a clock control terminal; and
  after the $j^{th}$ stage of shift register unit outputs a gate scan signal, the clock control terminal inputs a clock signal to turn on the repeat output module after a preset touch time ends, such that the shift delay module outputs a repeat scan signal to the output terminal of the $(j-n+1)^{th}$ stage of shift register unit through the repeat output module, and the $(j-n+1)^{th}$ stage of shift register unit to the $j^{th}$ stage of shift register unit re-output a scan signal to a gate line, where n is a positive integer equal to or larger than 1.

Optionally, when n is larger than or equal to 1, the repeat output module is also connected to a reference voltage terminal for controlling the repeat output module by the voltage of the reference voltage terminal to stop outputting the repeat scan signal to the output terminal of the $(j-n+1)^{th}$ stage of shift register unit when the $j^{th}$ stage of shift register unit repeatedly outputs the scan signal.

Optionally, the repeat output module comprises an output unit and a pull down unit;
  the shift delay module comprises i virtual shift register units connected in series, wherein the input terminal of the first stage of virtual shift register unit is connected to the output terminal of the $j^{th}$ stage of shift register unit, the output terminal of the first stage of virtual shift register unit is connected to the output unit, the clock control terminal is connected to the output unit, the output terminal of the $i^{th}$ virtual shift register unit is connected to the pull down unit and the input terminal of the $(j+1)^{th}$ stage of shift register unit, where i=n, and i is a positive integer larger than 1;
  wherein the output unit is configured to output the repeat scan signal to the output terminal of the $(j-n+1)^{th}$ stage of shift register unit under the control of the clock control terminal; and
  the pull down unit is also connected to the reference voltage terminal and an output control terminal of the first stage of virtual shift register unit, and is configured to control the first stage of virtual shift register unit by the voltage of the reference voltage terminal to stop outputting the repeat scan signal to the output terminal of the $(j-n+1)^{th}$ stage of shift register unit through the output unit.

Optionally, the repeat output module comprises an output unit and a pull down unit;
  the shift delay module comprises i virtual shift register units connected in series, wherein the input terminal of the first stage of virtual shift register unit is connected to the output terminal of the $j^{th}$ stage of shift register unit, the output terminal of the $i^{th}$ stage of virtual shift register unit is connected to the pull down unit and the input terminal of the $(j+1)^{th}$ stage of shift register unit, the clock control terminal is connected to the output unit, where i=2;
  wherein the output unit is configured to output the repeat scan signal to the output terminal of the $(j-n+1)^{th}$ stage of shift register unit under the control of the clock control terminal, wherein n=1; and
  the pull down unit is also connected to the reference voltage terminal and an output control terminal of the first stage of virtual shift register unit, and is configured to control the first stage of virtual shift register unit by the voltage of the reference voltage terminal to output a signal to the next stage of virtual shift register unit, so as to control the output terminal of the $i^{th}$ stage of virtual shift register unit to stop outputting the repeat scan signal to the output terminal of the $(j-n+1)^{th}$ stage of shift register unit through the output unit.

Optionally, the output unit comprises a first switch transistor whose gate is connected to the clock control terminal, whose source is connected to the shift delay module, and whose drain is connected to the output terminal of the $j^{th}$ stage of shift register unit; and
  the pull down unit comprises a second switch transistor whose gate is connected to the output terminal of the $n^{th}$ stage of virtual shift register unit, whose source is connected to the reference voltage terminal, and whose drain is connected to the gate of a gate line driving signal output transistor in the first stage of virtual shift register unit.

Optionally, when n is equal to 1, the repeat output module is also connected to a reference voltage terminal and the output terminal of the $(j+1)^{th}$ stage of shift register unit, the repeat output module is controlled by the voltage of the reference voltage terminal to stop outputting the repeat scan signal to the output terminal of the $j^{th}$ stage of shift register unit when the $(j+1)^{th}$ stage of shift register unit outputs the scan signal.

Optionally, the repeat output module comprises an output unit and a pull down unit;

the shift delay module comprises one first stage of virtual shift register unit, wherein the input terminal of the first stage of virtual shift register unit is connected to the output terminal of the $j^{th}$ stage of shift register unit, the output terminal of the first stage of virtual shift register unit is connected to the input terminal of the $(j+1)^{th}$ stage of shift register unit, and the output unit is connected to the clock control terminal;

wherein the output unit is configured to output the repeat scan signal to the output terminal of the $j^{th}$ stage of shift register unit under the control of the clock control terminal; and the pull down unit is also connected to the reference voltage terminal, the output terminal of the $(j+1)^{th}$ stage of shift register unit and an output control terminal of the first stage of virtual shift register unit, and is configured to control the first stage of virtual shift register unit by the voltage of the reference voltage terminal to stop outputting the repeat scan signal to the output terminal of the $j^{th}$ stage of shift register unit when the $(j+1)^{th}$ stage of shift register unit outputs the scan signal.

Optionally, the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $(j+1)^{th}$ stage of shift register unit, whose source is connected to the reference voltage terminal, and whose drain is connected to the gate of a gate line driving signal output transistor in the first stage of virtual shift register unit.

In one aspect, there is provided a display apparatus comprising any gate driving circuit described in the above.

In one aspect, there is provided a gate line driving method when a shift delay module is arranged between the $j^{th}$ stage of shift register unit and the $(j+1)^{th}$ stage of shift register unit which are adjacent to each other, comprising:

controlling by a clock control terminal a repeat output module to turn on after a touch time ends, such that the shift delay module outputs a repeat scan signal to the output terminal of the $(j-n+1)^{th}$ stage of shift register unit corresponding thereto previously through the repeat output module; and re-outputting a scan signal to a gate line by the $(j-n+1)^{th}$ stage of shift register unit to the $j^{th}$ stage of shift register unit.

Optionally, the repeat output module stops outputting the repeat scan signal to the output terminal of the $(j-n+1)^{th}$ stage of shift register unit after the $j^{th}$ stage of shift register unit re-outputs the scan signal or after the $(j+1)^{th}$ stage of shift register unit outputs the scan signal.

According to the gate driving circuit, the gate line driving method and the display apparatus of embodiments of the present disclosure, it is possible to control the repeat output module by the shift delay module and the clock control terminal to repeatedly output the gate driving signal of the gate driving shift register unit before the touch stage, such as to solve the display defects caused by the interrupt of the scan signal in the touch screen technology with time division driving.

BRIEF DESCRIPTION OF THE DRAWINGS

In order to describe the solutions of embodiments of the present disclosure more clearly, the figures needing to be used in the description of the embodiments or the prior art are introduced briefly in the following. Obviously, the figures described in the following are only part of embodiments of the present disclosure.

DETAILED DESCRIPTION

Figure 1:
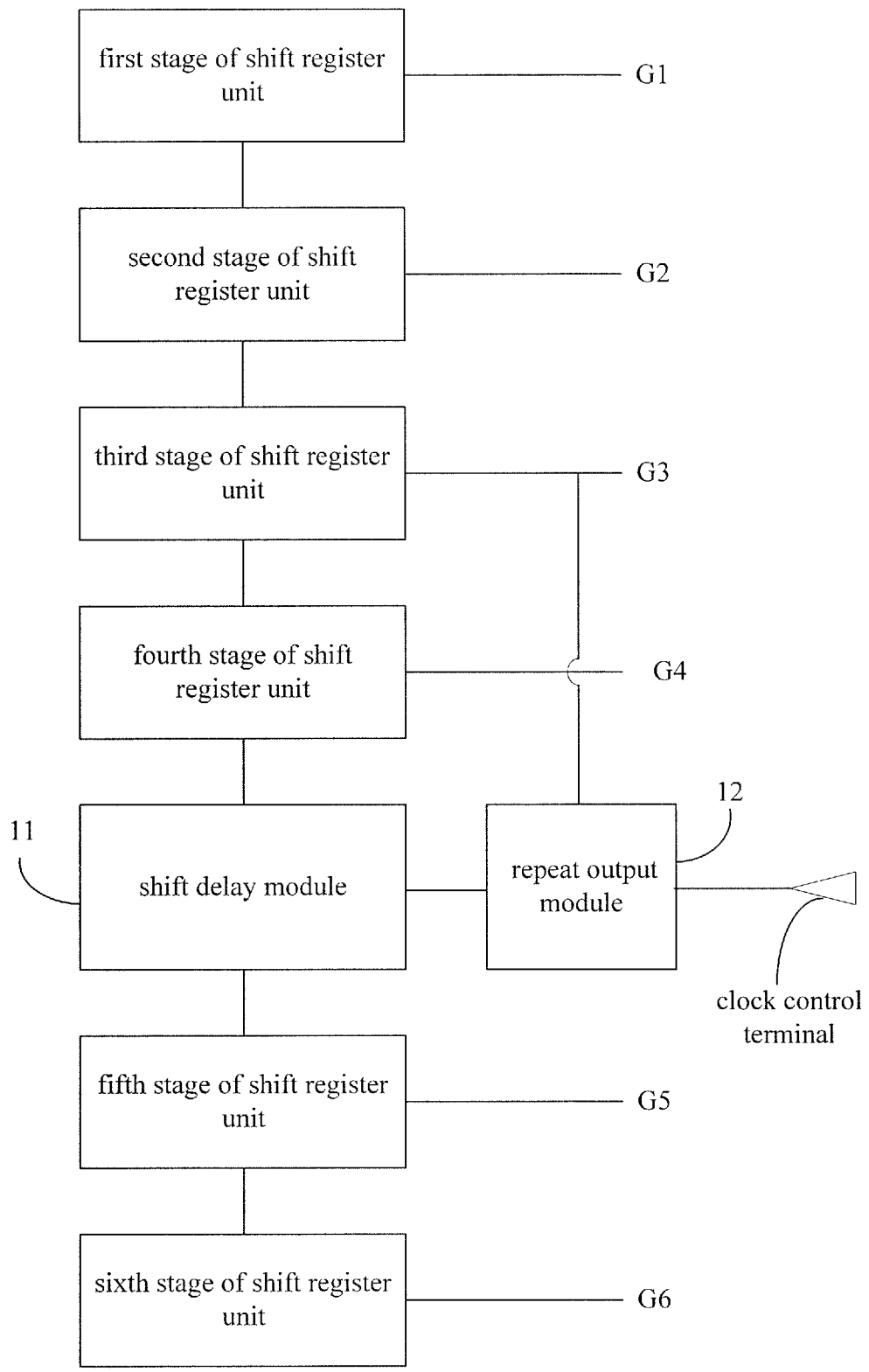
FIG. 1 is a schematic structural diagram of a gate driving circuit provided by an embodiment of the present disclosure.

In the following, the technical solutions in embodiments of the present disclosure will be clearly and completely described in connection with the drawings. Obviously, the described embodiments are only part of embodiments of the present disclosure, but not all of them.

The transistors adopted in all the embodiments of the present disclosure can be thin film transistors or field effect transistors, or any other devices with similar characteristics. Since the source and the drain of the transistor adopted herein are symmetrical, there is no difference between its source and drain. In embodiments of the present disclosure, in order to distinguish the two electrodes other than the gate of the transistor, one electrode thereof is referred to as the source, and the other electrode is referred to as the drain. In the configuration shown in the drawings, it provides that the middle terminal of the transistor is the gate, the signal input terminal is the source, and the signal output terminal is the drain. In addition, the adopted transistors by the embodiments of the present disclosure are all P type transistors or N type transistors. A P type transistor is turned on when the gate is at a low level, and an N type transistor is turned on when the gate is at a high level.

Referring to FIG. 1, a gate driving circuit according to an embodiment of the present disclosure comprises multiple shift register units connected in series (in FIG. 1, description is made by taking the first stage of shift register unit to the sixth stage of shift register unit as an example).

A shift delay module 11 is connected between the $j^{th}$ stage of shift register unit and the $(j+1)^{th}$ stage of shift register unit which are adjacent to each other in series (in the figure, description is made by taking j=4 as an example).

The shift delay module 11 is connected to the output terminal of the $j^{th}$ stage of shift register unit and the input terminal of the $(j+1)^{th}$ stage of shift register unit, and the shift delay module is also connected to the repeat output module.

The repeat output module 12 is connected to the output terminal of the $(j-n+1)^{th}$ stage of shift register unit and a clock control terminal.

After the $j^{th}$ stage of shift register unit outputs a gate scan signal, the clock control terminal inputs a clock signal to turn on the repeat output module 12 after a preset touch time ends, such that the shift delay module 11 outputs a repeat scan signal to the output terminal of the $(j-n+1)^{th}$ stage of shift register unit through the repeat output module 12, and the $(j-n+1)^{th}$ stage of shift register unit to the $j^{th}$ stage of shift register unit re-output a scan signal to a gate line, where n is a positive integer equal to or larger than 1. Referring to FIG. 1, each shift register unit is connected to one corresponding gate line (G1-G6).

Optionally, FIG. 1 shows that the repeat output module 12 is connected to the output terminal of the third stage of shift register unit so as for gate lines G3 and G4 to repeatedly output the scan signal. Of course, according to specific requirements, it is also possible to connect the repeat output module 12 to the output terminal of any stage of shift register unit previous to the fourth stage of shift register unit.

According to the gate driving circuit of an embodiment of the present disclosure, it is possible to control the repeat output module by the shift delay module and the clock control terminal to repeatedly output the gate driving signal of the gate driving shift register unit before the touch stage, such as to solve the display defects caused by the interrupt of the scan signal in the touch screen technology with time division driving.

Figure 2:
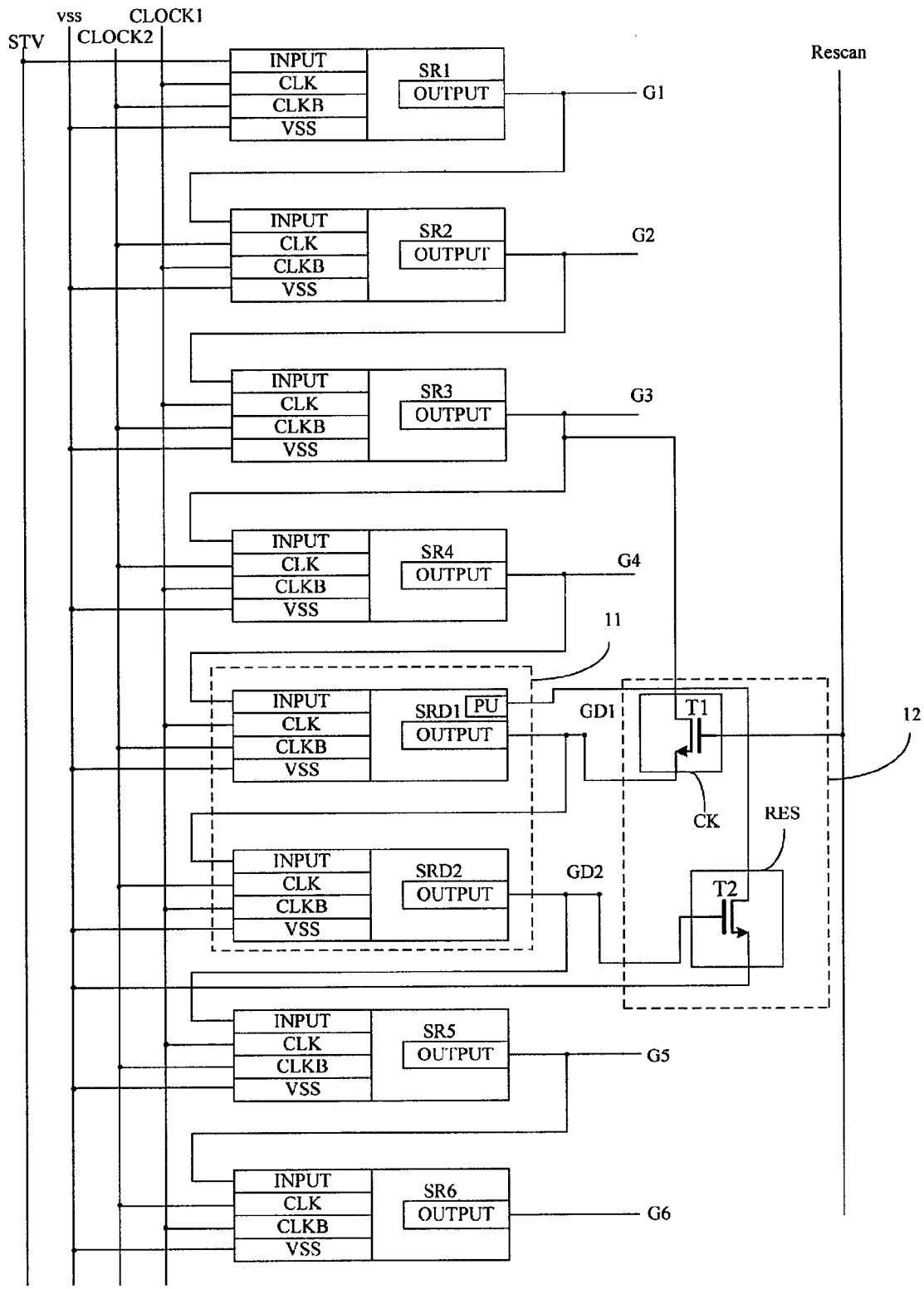
FIG. 2 is a schematic structural diagram of a gate driving circuit provided by another embodiment of the present disclosure.

Referring to FIG. 2, a gate driving circuit according to another embodiment of the present disclosure comprises multiple shift register Gate Driver On Array (GOA) units connected in series.

Except the first and the last GOA units, the output terminal of each GOA unit is connected to the input terminal of the next adjacent GOA unit, and the input terminal of each GOA unit is connected to the output terminal of the previous adjacent GOA unit. Each shift register unit also comprises one first clock signal terminal, one second clock signal terminal and one reference voltage terminal. In addition, the input terminal of the first shift register unit receives a frame start signal STV, the output terminal of the first shift register unit is connected to one gate line, and the input terminal of the last shift register unit is connected to the output terminal of its previous adjacent shift register unit.

In the embodiment, the output terminal of each gate driving shift register unit is connected to one gate line and supplies a driving signal to the gate line. In FIG. 2, description is made by taking shift register unit SR1 to shift register unit SR6 as an example. The shift delay module 11 is connected in series between the $j^{th}$ stage of shift register unit and the $(j+1)^{th}$ stage of shift register unit which are adjacent to each other. In FIG. 2, description is made by taking j=4 as an example.

In FIG. 2, the shift delay module 11 is connected to the output terminal of the $j^{th}$ stage of shift register unit and the input terminal of the $(j+1)^{th}$ stage of shift register unit, and the shift delay module is also connected to the repeat output module.

The repeat output module 12 is connected to the output terminal of the $(j-n+1)^{th}$ stage of shift register unit and a clock control terminal Rescan.

After the $j^{th}$ stage of shift register unit outputs a gate scan signal, the clock control terminal inputs a clock signal to turn on the repeat output module 12 after a preset touch time ends, such that the shift delay module 11 outputs a repeat scan signal to the output terminal of the $(j-n+1)^{th}$ stage of shift register unit through the repeat output module 12, and the $(j-n+1)^{th}$ stage of shift register unit to the $j^{th}$ stage of shift register unit re-output a scan signal to the gate line, where n is a positive integer equal to or larger than 1. As referring to FIG. 1, each shift register unit is connected to one corresponding gate line (G1-G6).

When n is larger than or equal to 1, the repeat output module 12 is also connected to a reference voltage terminal, and the repeat output module 12 is controlled by the voltage of the reference voltage terminal to stop outputting the repeat scan signal to the output terminal of the $(j-n+1)^{th}$ stage of shift register unit when the $j^{th}$ stage of shift register unit repeatedly outputs the scan signal.

Optionally, referring to FIG. 2, the repeat output module 12 comprises an output unit CK and a pull down unit RES.

The shift delay module 11 comprises i virtual shift register units connected in series, wherein the input terminal of the first stage of virtual shift register unit is connected to the output terminal of the $j^{th}$ stage of shift register unit, the output terminal of the first stage of virtual shift register unit is connected to the output unit, the clock control terminal Rescan is connected to the output unit CK, the output terminal of the $i^{th}$ virtual shift register unit is connected to the input terminal of the $(j+1)^{th}$ stage of shift register unit, where i=n, and i is a positive integer larger than 1.

The output unit CK is configured to output the repeat scan signal to the output terminal of the $(j-n+1)^{th}$ stage of shift register unit under the control of the clock control terminal Rescan.

The pull down unit RSE is also connected to the reference voltage terminal and an output control terminal of the first stage of virtual shift register unit, and is configured to control the first stage of virtual shift register unit by the voltage of the reference voltage terminal to stop outputting the repeat scan signal to the output terminal of the $(j-n+1)^{th}$ stage of shift register unit through the output unit.

Specifically, the gate driving circuit as shown in FIG. 2 comprises several shift register units connected in series, wherein the output terminal OUTPUT of the shift register unit SR1 is connected to one gate line G1. The input terminal INPUT of the shift register unit SR2 is connected to the output terminal of the shift register unit SR1 and connected to one gate line G2. The input terminal INPUT of the shift register unit SR3 is connected to the output terminal of the shift register unit SR2 and connected to one gate line G3. The input terminal INPUT of the shift register unit SR4 is connected to the output terminal of the shift register unit SR3 and connected to one gate line G4. The input terminal INPUT of the virtual shift register unit SRD1 is connected to the output terminal of the shift register unit SR4 and connected to one gate line GD1. The input terminal INPUT of the virtual shift register unit SRD2 is connected to the output terminal of the virtual shift register unit SRD1 and connected to one gate line GD2. The input terminal INPUT of the shift register unit SR5 is connected to the output terminal of the virtual shift register unit SRD2 and connected to one gate line G5. The input terminal INPUT of the shift register unit SR6 is connected to the output terminal of the shift register unit SR5 and connected to one gate G6. In addition, the output unit CK of the repeat output module 12 is connected to the output terminal of the virtual shift register unit SRD1, the output terminal of the shift register unit SR3 and the clock control terminal Rescan, and the output unit CK is controlled by the clock control terminal Rescan to output a signal at the output terminal of the connected shift register unit SR3 when the output terminal of the virtual shift register unit SRD1 corresponding to the output unit CK outputs a signal. As such, it is possible to realize the repeat output of the two stages of shift register units SR3 and SR4 after the touch stage ends, thereby improving the picture quality.

Further, the repeat output module 12 also comprises a pull down unit RES. The pull down unit RES is connected to the output terminal of the virtual shift register unit SRD2. The pull down unit RES is also connected to the output control terminal PU of the virtual shift register unit SRD1. The pull down unit RES is also connected to the reference voltage vss, and is configured to control the virtual shift register unit SRD1 by the voltage of the reference voltage terminal to stop outputting the repeat scan signal to the output terminal of the shift register unit SR3 through the output unit.

Each shift register unit and each virtual shift register unit both comprise one first clock signal terminal CLK, one second clock signal terminal CLKB and a reference voltage terminal VSS, wherein for each stage of shift register unit and each stage of virtual shift register unit, the first clock signal terminal CLK receives a clock signal opposite to the clock signal at the second clock signal terminal CLKB. More specifically, an odd stage of shift register unit or virtual shift register unit receives a clock signal CLOCK1 at its first clock signal terminal CLK, and receives a clock signal opposite to the clock signal CLOCK1 at its second clock signal terminal CLKB. An even stage of shift register unit or virtual shift register unit receives a clock signal CLOCK2 at its first clock signal terminal CLK, and receives a clock signal opposite to the clock signal CLOCK2 at its second clock signal terminal CLKB. In addition, the clock signal CLOCK1 is opposite to the clock signal CLOCK2.

Further, the first clock signal terminal CLK and the second clock signal terminal CLKB of each stage of shift register unit or virtual shift register unit acquire a clock signal respectively by connecting to a system clock. For example, FIG. 2 provides a connection manner in which the first clock signal terminal CLK of an odd stage of shift register unit or virtual shift register unit is connected to the system clock CLOCK1 and its second clock signal terminal is connected to the system clock CLOCK2, and the first clock signal terminal CLK of an even stage of shift register unit or virtual shift register unit is connected to the system clock CLOCK2 and its second clock signal terminal is connected to the system clock CLOCK1. The reference voltage terminal VSS is connected to the reference voltage vss. Here, referring to the time sequence diagram for signals shown in FIG. 6 (including signals at input terminals of respective stages of shift register units, a set of system clock signals which are the first clock signal CLOCK1 and the second clock signal CLOCK2), during the touch stage, the system clock signals are stopped to be output; during the output stage, the high level or the low level of both the system clock signals CLOCK1 and CLOCK2 has a duty ratio of 1:1 (i.e., the duty ratios of CLOCK1 and CLOCK2 are 50% respectively), that is, after the low level signal of CLOCK1 ends, a low level signal of CLOCK2 begins, and after said low level signal of CLOCK2 ends, the next low level clock signal of CLOCK1 begins, and this cycle repeats. The output of the high level signals is the same, which will not be described again.

In the embodiment, the first shift register unit is SR1, the input signal INPUT of the GOA unit SR1 is one activating pulse signal, optionally, such as a frame start signal STV, and the first system clock signal CLOCK1 begins to be output after the STV signal ends.

Further, referring to FIG. 2, the output unit CK comprises a first switch transistor T1 whose gate is connected to the clock control terminal Rescan, whose source is connected to the shift delay module, and whose drain is connected to the output terminal of the $(j-n+1)^{th}$ stage of shift register unit.

The pull down unit RES comprises a second switch transistor T2 whose gate is connected to the output terminal of the $n^{th}$ stage of virtual shift register unit, whose source is connected to the reference voltage terminal, and whose drain is connected to the output control terminal PU of the first stage of virtual shift register unit SRD1 (for example, the gate of a gate line driving signal output transistor in the first stage of virtual shift register unit).

Figure 3:
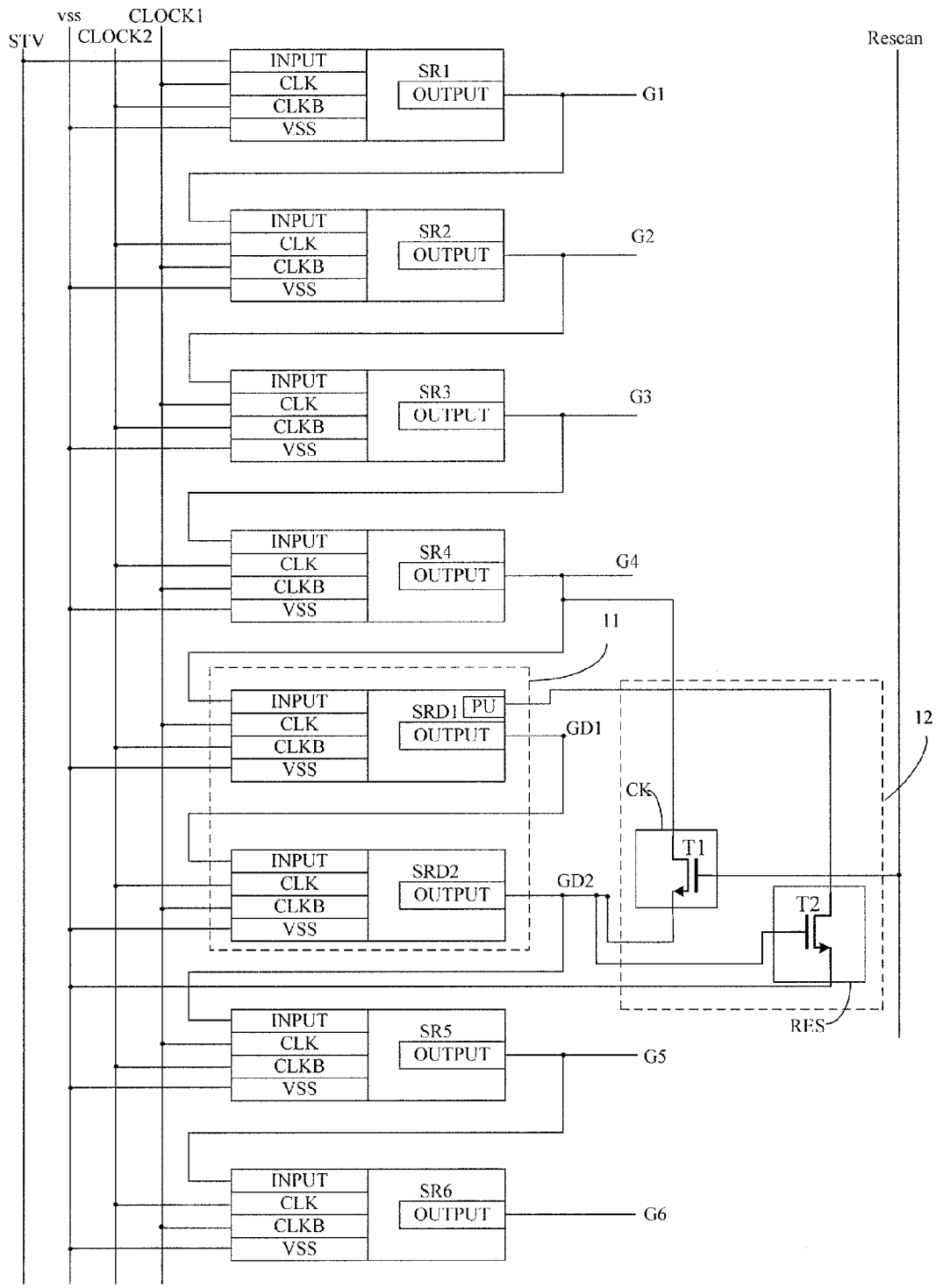
FIG. 3 is a schematic structural diagram of a gate driving circuit provided by yet another embodiment of the present disclosure.

Alternatively, referring to FIG. 3, the repeat output module 12 comprises an output unit CK and a pull down unit RSE.

The shift delay module 11 comprises i virtual shift register units connected in series, wherein the input terminal of the first stage of virtual shift register unit is connected to the output terminal of the $j^{th}$ stage of shift register unit, the output terminal of the $i^{th}$ stage of virtual shift register unit is connected to the pull down unit RSE of the repeat output module 12 and the input terminal of the $(j+1)^{th}$ stage of shift register unit, the clock control terminal Rescan is connected to the output unit CK of the repeat output module 12, where i=2. It should be noted that i can also be larger than 2, but only two virtual shift register units are enough to realize the function of shift delay.

The output unit CK is configured to output the repeat scan signal to the output terminal of the $(j-n+1)^{th}$ stage of shift register unit (the shift register unit SR4 in FIG. 3) under the control of the clock control terminal Rescan, where n=1.

The pull down unit RSE is also connected to the reference voltage terminal and an output control terminal PU of the first stage of virtual shift register unit, and is configured to control the first stage of virtual shift register unit by the voltage of the reference voltage terminal to output a signal to the next stage of virtual shift register unit, so as to control the output terminal of the $i^{th}$ stage of virtual shift register unit to stop outputting the repeat scan signal to the output terminal of the $(j-n+1)^{th}$ stage of shift register unit through the output unit.

Referring to FIG. 3, the output unit CK comprises a first switch transistor T1 whose gate is connected to the clock control terminal Rescan, whose source is connected to the shift delay module, and whose drain is connected to the output terminal of the $j^{th}$ stage of shift register unit.

The pull down unit RES comprises a second switch transistor T2 whose gate is connected to the output terminal of the second stage of virtual shift register unit, whose source is connected to the reference voltage terminal, and whose drain is connected to the gate of a gate line driving signal output transistor in the first stage of virtual shift register unit, i.e. the point PU.

Figure 4:
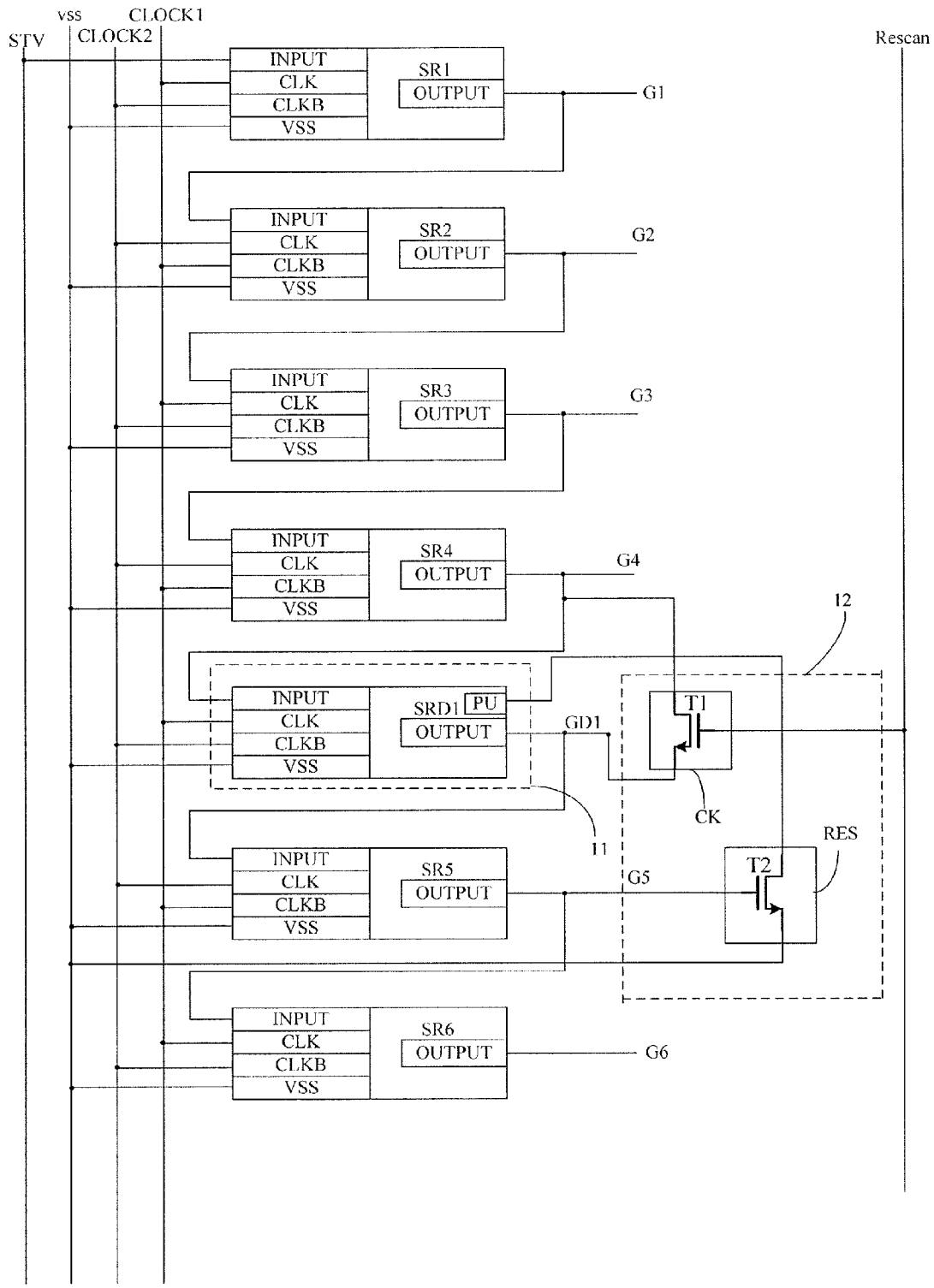
FIG. 4 is a schematic structural diagram of a gate driving circuit provided by yet another embodiment of the present disclosure.

Alternatively, referring to FIG. 4, when n is equal to 1, the repeat output module 12 is also connected to a reference voltage terminal and the output terminal of the $(j+1)^{th}$ stage of shift register unit, and the repeat output module is controlled by the voltage of the reference voltage terminal to stop outputting the repeat scan signal to the output terminal of the $j^{th}$ stage of shift register unit when the $(j+1)^{th}$ stage of shift register unit outputs the scan signal.

Optionally, the repeat output module 12 comprises an output unit CK and a pull down unit RES.

The shift delay module 11 comprises one first stage of virtual shift register unit, wherein the input terminal of the first stage of virtual shift register unit is connected to the output terminal of the $j^{th}$ stage of shift register unit, the output terminal of the first stage of virtual shift register unit is connected to the input terminal of the $(j+1)^{th}$ stage of shift register unit, and the output unit CK included in the repeat output module 12 is connected to the clock control terminal Rescan.

At this time, the output unit CK is configured to output the repeat scan signal to the output terminal of the $j^{th}$ stage of shift register unit under the control of the clock control terminal Rescan.

The pull down unit RES is also connected to the reference voltage terminal, the output terminal of the $(j+1)^{th}$ stage of shift register unit and an output control terminal PU of the first stage of virtual shift register unit, and is configured to control the first stage of virtual shift register unit by the voltage of the reference voltage terminal to stop outputting the repeat scan signal to the output terminal of the $j^{th}$ stage of shift register unit when the $(j+1)^{th}$ stage of shift register unit outputs the scan signal.

Specifically, the output unit CK comprises a first switch transistor T1 whose gate is connected to the clock control terminal Rescan, whose source is connected to the shift delay module, and whose drain is connected to the output terminal of the $j^{th}$ stage of shift register unit.

The pull down unit RES comprises a second switch transistor T2 whose gate is connected to the output terminal of the $(j+1)^{th}$ stage of virtual shift register unit, whose source is connected to the reference voltage terminal, and whose drain is connected to the output control terminal PU of the first stage of virtual shift register unit SRD1 (for example, the gate of a gate line driving signal output transistor in the first stage of virtual shift register unit).

In the embodiment shown in FIG. 4, the shift delay module 11 comprises only one virtual shift register unit SRD1, to realize the repeat output of the scan signal at the gate line G4 after the touch is received by outputting the repeat scan signal to the output terminal of the shift register unit SR4.

Figure 5:
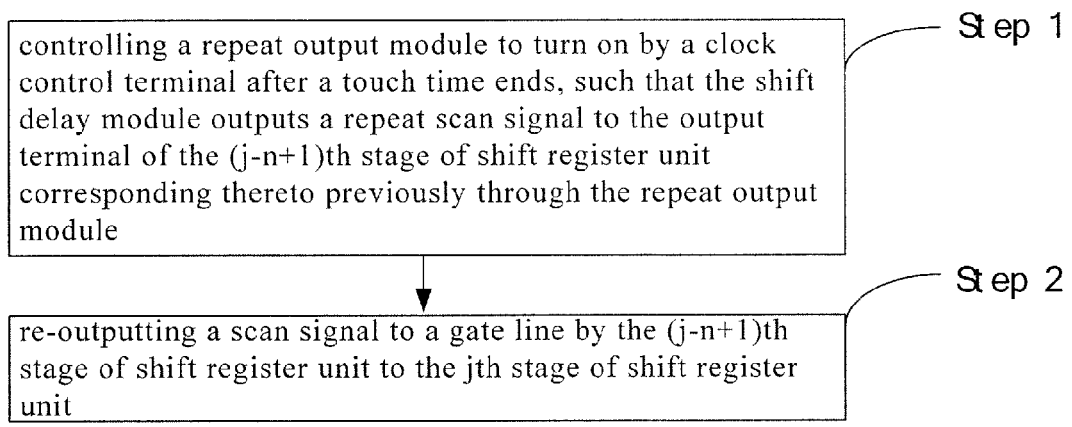
FIG. 5 is a schematic flowchart of a gate line driving method provided by a embodiment of the present disclosure.

Referring to FIG. 5, a gate line driving method according to an embodiment of the present disclosure comprises the steps of:

in step 1, after a touch time ends, a clock control terminal controls to turn on the repeat output module, such that the shift delay module outputs a repeat scan signal to the output terminal of the $(j-n+1)^{th}$ stage of shift register unit corresponding thereto previously through the repeat output module; and in step 2, the $(j-n+1)^{th}$ stage of shift register unit to the $j^{th}$ stage of shift register unit re-output a scan signal to a gate line.

Optionally, the method also comprises a step 3 at which the repeat output module stops outputting the repeat scan signal to the output terminal of the $(j-n+1)^{th}$ stage of shift register unit after the $j^{th}$ stage of shift register unit re-outputs the scan signal or after the $(j+1)^{th}$ stage of shift register unit outputs the scan signal.

According to the gate line driving method of an embodiment of the present disclosure, it is possible to control the repeat output module by the shift delay module and the clock control terminal to repeatedly output the gate driving signal of the gate driving shift register unit before the touch stage, such as to solve the display defects caused by the interrupt of the scan signal in the touch screen technology with time division driving.

Figure 6:
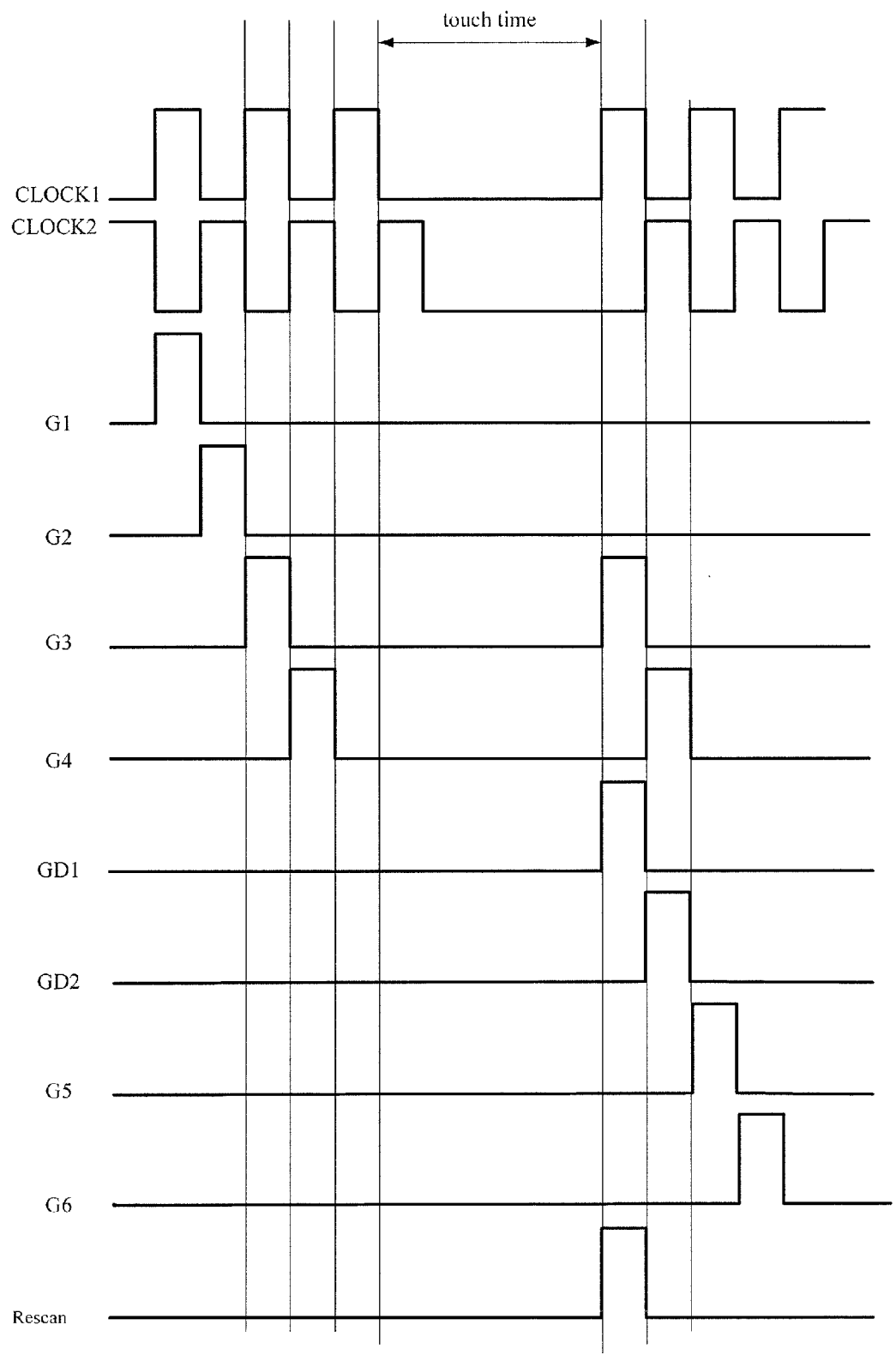
FIG. 6 is a schematic diagram of output time sequence states of a gate line driving method provided by an embodiment of the present disclosure.

Specifically, referring to the gate driving circuit as shown in FIG. 2 and the operation time sequence diagram of the gate driving circuit provided in FIG. 6, the operation procedure of the gate line driving method of an embodiment of the present disclosure may be as follows.

STV is the start signal, and each stage of shift register (including the shift register unit and the virtual shift register unit provided in embodiments of the present disclosure) takes the output signal at the output terminal of its previous stage as its start signal. Operating under double clocks (CLOCK1 and CLOCK2), the first four shift register units SR1, SR2, SR3 and SR4 perform gate driving scan outputs G1, G2, G3 and G4 from the top downwards, and then the clock signals stop to enter the touch time.

When the touch time ends, the clock signals are actuated again. When CLOCK1 is at a high level, the output terminal of the virtual shift register unit SRD1 outputs a high level at GD1. While GD1 outputs a high level, the clock control terminal Rescan outputs a high level to turn on T1, and the high level of GD1 is transported to G3. At this time, G3 is also at a high level, realizing the repeat scan for the gate line G3 corresponding to SR3. The signal at the gate line G3 is taken as the input signal of SR4, and when the next clock comes, SR4 outputs a scan signal to the gate line G4 again. Therefore, the repeat output to gate lines G3 and G4 is realized. It needs to be specially noted here that the output signals of GD1 and GD2 do not connected into the pixel area, and thus have not any influence on the pixel display.

Then, GD2 is taken as the start signal of SR5 to make G5 output a high level. Then, SR5, SR6 and SR7 outputs high level signals in turn to perform scan for G5, G6, G7 . . . in turn.

When G4 and GD2 are at high levels simultaneously, in order to prevent GD1 being pulled up by G4 again, i.e., in order to prevent GD1 and GD2 performing repeat output again, the terminal PU of SRD1 is pulled down by T2 in an embodiment of the present disclosure to prevent GD1 from outputting a high level again.

Figure 7:
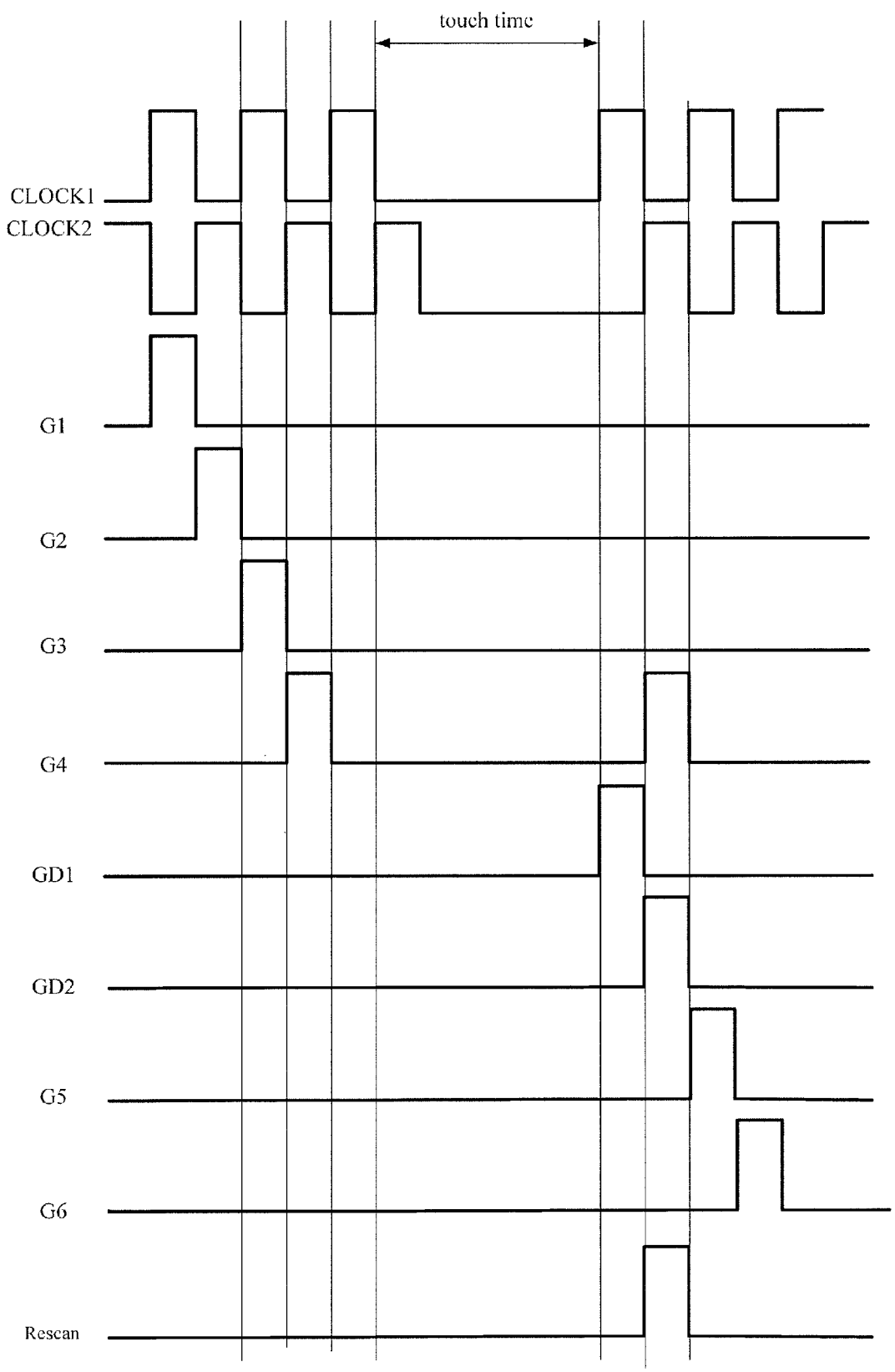
FIG. 7 is a schematic diagram of output time sequence states of a gate line driving method provided by another embodiment of the present disclosure.

Specifically, referring to the gate driving circuit as shown in FIG. 3 and the operation time sequence diagram of the gate driving circuit provided in FIG. 7, the operation procedure of the gate line driving method of an embodiment of the present disclosure may be as follows.

STV is the start signal, and each stage of shift register (including the shift register unit and the virtual shift register unit provided in embodiments of the present disclosure) takes the output signal at the output terminal of its previous stage as its start signal. Operating under double clocks (CLOCK1 and CLOCK2), the first four shift register units SR1, SR2, SR3 and SR4 perform gate driving scan outputs G1, G2, G3 and G4 from the top downwards, and then the clock signals stop and the touch time is entered.

When the touch time ends, the clock signals are actuated again. When CLOCK1 is at a high level, the output terminal of the virtual shift register unit SRD1 outputs a high level at GD1. GD1 outputs a high level as the input signal of the virtual shift register unit SRD2. When the next clock comes, the virtual shift register unit SRD2 outputs a high level at GD2, the clock control terminal Rescan output a high level to turn on the first switch transistor T1, and the high level signal of G2 is transported to G4. At this time, G4 is also at a high level, realizing the repeat scan for the gate line G4 corresponding to SR4. It needs to be specially noted here that the output signals of GD1 and GD2 do not access to the pixel area, and thus have not any influence on the pixel display.

Then, GD2 is taken as the start signal of SR5 to make G5 output a high level. Then, SR5, SR6 and SR7 outputs high level signals in turn to perform scan for G5, G6, G7 . . . in turn.

When G4 and GD2 are at high levels simultaneously, in order to prevent GD1 being pulled up by G4 again, i.e., in order to prevent GD1 and GD2 performing repeat output again, the terminal PU of SRD1 is pulled down by T2 in an embodiment of the present disclosure to prevent GD1 from outputting a high level again.

Figure 8:
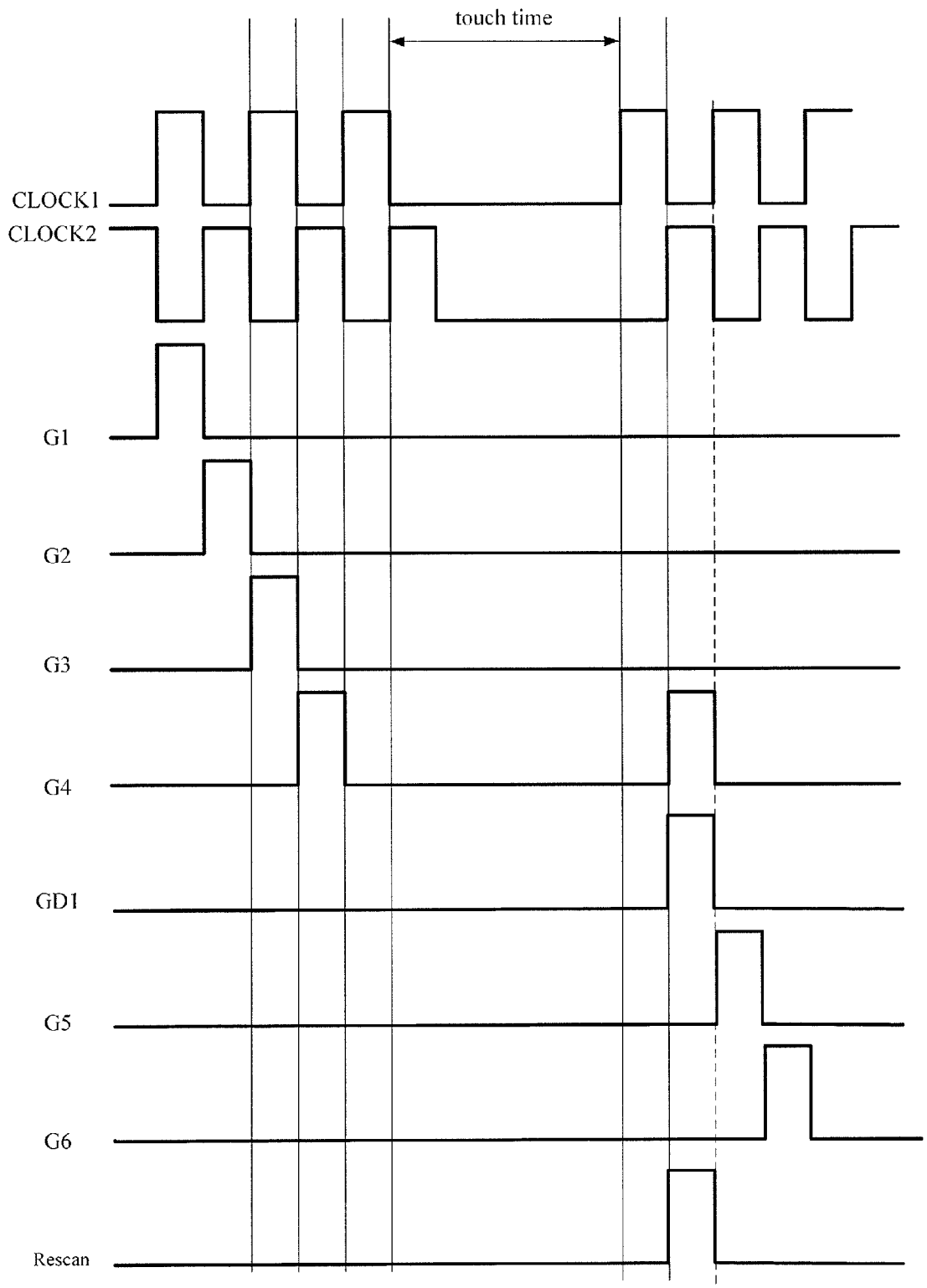
FIG. 8 is a schematic diagram of output time sequence states of a gate line driving method provided by yet another embodiment of the present disclosure.

Specifically, referring to the gate driving circuit as shown in FIG. 4 and the operation time sequence diagram of the gate driving circuit provided in FIG. 8, the operation procedure of the gate line driving method of an embodiment of the present disclosure is as followings.

STV is the start signal, and each stage of shift register (including the shift register unit and the virtual shift register unit provided in embodiments of the present disclosure) takes the output signal at the output terminal of its previous stage as its start signal. Operating under double clocks (CLOCK1 and CLOCK2), the first four shift register units SR1, SR2, SR3 and SR4 perform gate driving scan outputs G1, G2, G3 and G4 from the top downwards, and then the clock signals stop to enter the touch time.

When the touch time ends, the clock signals are provided again. When CLOCK1 is at a high level, the output terminal of the virtual shift register unit SRD1 outputs a high level at GD1. While GD1 outputs a high level, the clock control terminal Rescan outputs a high level to turn on T1, and the high level of GD1 is transported to G4. At this time, G4 is also at a high level, realizing the repeat scan for the gate line G4 corresponding to SR4. It needs to be specially noted here that the output signal of GD1 does not connected into the pixel area, and thus has not any influence on the pixel display.

Then, GD2 is taken as the start signal of SR5 to make G5 output a high level. Then, SR5, SR6 and SR7 outputs high level signals in turn to perform scan for G5, G6, G7 . . . in turn.

When G5 are at a high level, in order to prevent GD1 being pulled up by G4 again, i.e., in order to prevent GD1 performing repeat output again, the terminal PU of SRD1 is pulled down by T2 in an embodiment of the present disclosure to prevent GD1 from outputting a high level again.

In the above, description is only made by taking the scan signal with a high level as an example, in which corresponding switch transistors are all turned on by high levels. Similarly, depending on the voltage requirement of pixel units and the internal structure of shift registers when designing the display apparatus, the scan signal can also be implemented by low levels, and at this time, corresponding switch transistors are all turned on by low levels.

There also provides in the embodiments of the present disclosure a display apparatus comprising the above gate driving circuit.

According to the display apparatus provided by the embodiments of the present disclosure, it is possible to control the repeat output module by the shift delay module and the clock control terminal to repeatedly output the gate driving signal of the gate driving shift register unit before the touch stage, such as to solve the display defects caused by the interrupt of the scan signal in the touch screen technology with time division driving.

The above description is only specific implementation of the present disclosure, but the protection scope of the present disclosure is not limited to this. Those skilled in the art can devise alternations or replacements which should be included within the protection scope of the present disclosure based on the disclosed technical scope herein. Therefore, the protection scope of the present disclosure should be defined by the protection scope of the claims.

What is claimed is:

1. A gate driving circuit comprising multiple shift register units connected in series, wherein it further comprises a shift delay module and a repeat output module, and the shift delay module is connected in series between the $j^{th}$ stage of shift register unit and the $(j+1)^{th}$ stage of shift register unit which are adjacent to each other wherein j is a positive integer;
    the shift delay module is connected to the output terminal of the $j^{th}$ stage of shift register unit and the input terminal of the $(j+1)^{th}$ stage of shift register unit, and also connected to the repeat output module;
    the repeat output module is connected to the output terminal of the $(j-n+1)^{th}$ stage of shift register unit and a clock control terminal, wherein n is a positive integer and n is equal to or less than j; and
    after the $j^{th}$ stage of shift register unit outputs a gate scan signal, a clock signal is input from the clock control terminal to turn on the repeat output module after a preset touch time ends, such that the shift delay module outputs a repeat scan signal to the output terminal of the $(j-n+1)^{th}$ stage of shift register unit through the repeat output module, and each of the shift register units from the $(j-n+1)^{th}$ stage to the $j^{th}$ stage re-outputs a scan signal to a gate line in sequence.

2. The gate driving circuit of claim 1, wherein the repeat output module is also connected to a reference voltage terminal, and the repeat output module is controlled by the voltage of the reference voltage terminal to stop outputting the repeat scan signal to the output terminal of the $(j-n+1)^{th}$ stage of shift register unit when the $j^{th}$ stage of shift register unit outputs repeatedly the scan signal.

3. The gate driving circuit of claim 2, wherein the repeat output module comprises an output unit and a pull down unit;
    the shift delay module comprises i virtual shift register units connected in series, wherein the input terminal of the first stage of virtual shift register unit is connected to the output terminal of the $j^{th}$ stage of shift register unit, the output terminal of the first stage of virtual shift register unit is connected to the output unit, the clock control terminal is connected to the output unit, the output terminal of the $i^{th}$ virtual shift register unit is connected to the pull down unit and the input terminal of the $(j+1)^{th}$ stage of shift register unit, where i=n;
    the output unit is configured to output the repeat scan signal to the output terminal of the $(j-n+1)^{th}$ stage of shift register unit under the control of the clock control terminal; and
    the pull down unit is also connected to the reference voltage terminal and an output control terminal of the first stage of virtual shift register unit, and is configured to control the first stage of virtual shift register unit by the voltage of the reference voltage terminal to stop outputting the repeat scan signal to the output terminal of the $(j-n+1)^{th}$ stage of shift register unit through the output unit.

4. The gate driving circuit of claim 3, wherein the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $n^{th}$ stage of virtual shift register unit, whose source is connected to the reference voltage terminal, and whose drain is connected to the gate of a gate line driving signal output transistor in the first stage of virtual shift register unit.

5. The gate driving circuit of claim 2, wherein the repeat output module comprises an output unit and a pull down unit;

the shift delay module comprises i virtual shift register units connected in series, wherein the input terminal of the first stage of virtual shift register unit is connected to the output terminal of the $j^{th}$ stage of shift register unit, the output terminal of the $i^{th}$ stage of virtual shift register unit is connected to the pull down unit and the input terminal of the $(j+1)^{th}$ stage of shift register unit, and the clock control terminal is connected to the output unit, where i=2;

the output unit is configured to output the repeat scan signal to the output terminal of the $(j-n+1)^{th}$ stage of shift register unit under the control of the clock control terminal, where n=1; and the pull down unit is also connected to the reference voltage terminal and an output control terminal of the first stage of virtual shift register unit, and is configured to control the first stage of virtual shift register unit by the voltage of the reference voltage terminal to output a signal to the next stage of virtual shift register unit, so as to control the output terminal of the $i^{th}$ stage of virtual shift register unit to stop outputting the repeat scan signal to the output terminal of the $(j-n+1)^{th}$ stage of shift register unit through the output unit.

6. The gate driving circuit of claim 5, wherein the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $n^{th}$ stage of virtual shift register unit, whose source is connected to the reference voltage terminal, and whose drain is connected to the gate of a gate line driving signal output transistor in the first stage of virtual shift register unit.

7. The gate driving circuit of claim 1, wherein the repeat output module is also connected to a reference voltage terminal and the output terminal of the $(j+1)^{th}$ stage of shift register unit, and is configured to control the repeat output module by the voltage of the reference voltage terminal to stop outputting the repeat scan signal to the output terminal of the $j^{th}$ stage of shift register unit when the $(j+1)^{th}$ stage of shift register unit outputs the scan signal.

8. The gate driving circuit of claim 7, wherein the repeat output module comprises an output unit and a pull down unit;

the shift delay module comprises one first stage of virtual shift register unit, wherein the input terminal of the first stage of virtual shift register unit is connected to the output terminal of the $j^{th}$ stage of shift register unit, the output terminal of the first stage of virtual shift register unit is connected to the input terminal of the $(j+1)^{th}$ stage of shift register unit, and the output unit is connected to the clock control terminal;

the output unit is configured to output the repeat scan signal to the output terminal of the $j^{th}$ stage of shift register unit under the control of the clock control terminal; and the pull down unit is also connected to the reference voltage terminal, the output terminal of the $(j+1)^{th}$ stage of shift register unit and an output control terminal of the first stage of virtual shift register unit, and is configured to control the first stage of virtual shift register unit by the voltage of the reference voltage terminal to stop outputting the repeat scan signal to the output terminal of the $j^{th}$ stage of shift register unit when the $(j+1)^{th}$ stage of shift register unit outputs the scan signal.

9. The gate driving circuit of claim 8, wherein the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $(j+1)^{th}$ stage of shift register unit, whose source is connected to the reference voltage terminal, and whose drain is connected to the gate of a gate line driving signal output transistor in the first stage of virtual shift register unit.

10. A display apparatus comprising the gate driving circuit according to claim 1.

11. The display apparatus of claim 10, wherein the repeat output module is also connected to a reference voltage terminal, and the repeat output module is controlled by the voltage of the reference voltage terminal to stop outputting the repeat scan signal to the output terminal of the $(j-n+1)^{th}$ stage of shift register unit when the $j^{th}$ stage of shift register unit outputs repeatedly the scan signal.

12. The display apparatus of claim 11, wherein the repeat output module comprises an output unit and a pull down unit;

the shift delay module comprises i virtual shift register units connected in series, wherein the input terminal of the first stage of virtual shift register unit is connected to the output terminal of the $j^{th}$ stage of shift register unit, the output terminal of the first stage of virtual shift register unit is connected to the output unit, the clock control terminal is connected to the output unit, the output terminal of the $i^{th}$ virtual shift register unit is connected to the pull down unit and the input terminal of the $(j+1)^{th}$ stage of shift register unit, where i=n;

the output unit is configured to output the repeat scan signal to the output terminal of the $(j-n+1)^{th}$ stage of shift register unit under the control of the clock control terminal; and the pull down unit is also connected to the reference voltage terminal and an output control terminal of the first stage of virtual shift register unit, and is configured to control the first stage of virtual shift register unit by the voltage of the reference voltage terminal to stop outputting the repeat scan signal to the output terminal of the $(j-n+1)^{th}$ stage of shift register unit through the output unit.

13. The display apparatus of claim 12, wherein the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $n^{th}$ stage of virtual shift register unit, whose source is connected to the reference voltage terminal, and whose drain is connected to the gate of a gate line driving signal output transistor in the first stage of virtual shift register unit.

14. The display apparatus of claim 11, wherein the repeat output module comprises an output unit and a pull down unit;

the shift delay module comprises i virtual shift register units connected in series, wherein the input terminal of the first stage of virtual shift register unit is connected to the output terminal of the $j^{th}$ stage of shift register unit, the output terminal of the $i^{th}$ stage of virtual shift register unit is connected to the pull down unit and the input terminal of the $(j+1)^{th}$ stage of shift register unit, and the clock control terminal is connected to the output unit, where i=2;

the output unit is configured to output the repeat scan signal to the output terminal of the $(j-n+1)^{th}$ stage of shift register unit under the control of the clock control terminal, where n=1; and the pull down unit is also connected to the reference voltage terminal and an output control terminal of the first stage of virtual shift register unit, and is configured to control the first stage of virtual shift register unit by the voltage of the reference voltage terminal to output a signal to the next stage of virtual shift register unit, so as to control the output terminal of the $i^{th}$ stage of virtual shift register unit to stop outputting the repeat scan signal to the output terminal of the $(j-n+1)^{th}$ stage of shift register unit through the output unit.

15. The display apparatus of claim 13, wherein the output unit comprises a first switch transistor whose gate is connected to the clock control terminal, whose source is connected to the shift delay module, and whose drain is connected to the output terminal of the $j^{th}$ stage of shift register unit; and the pull down unit comprises a second switch transistor whose gate is connected to the output terminal of the $n^{th}$ stage of virtual shift register unit, whose source is connected to the reference voltage terminal, and whose drain is connected to the gate of a gate line driving signal output transistor in the first stage of virtual shift register unit.

16. The display apparatus of claim 10, wherein the repeat output module is also connected to a reference voltage terminal and the output terminal of the $(j+1)^{th}$ stage of shift register unit, and is configured to control the repeat output module by the voltage of the reference voltage terminal to stop outputting the repeat scan signal to the output terminal of the $j^{th}$ stage of shift register unit when the $(j+1)^{th}$ stage of shift register unit outputs the scan signal.

17. The display apparatus of claim 16, wherein the repeat output module comprises an output unit and a pull down unit;

the shift delay module comprises one first stage of virtual shift register unit, wherein the input terminal of the first stage of virtual shift register unit is connected to the output terminal of the $j^{th}$ stage of shift register unit, the output terminal of the first stage of virtual shift register unit is connected to the input terminal of the $(j+1)^{th}$ stage of shift register unit, and the output unit is connected to the clock control terminal;

the output unit is configured to output the repeat scan signal to the output terminal of the $j^{th}$ stage of shift register unit under the control of the clock control terminal; and the pull down unit is also connected to the reference voltage terminal, the output terminal of the $(j+1)^{th}$ stage of shift register unit and an output control terminal of the first stage of virtual shift register unit, and is configured to control the first stage of virtual shift register unit by the voltage of the reference voltage terminal to stop outputting the repeat scan signal to the output terminal of the $j^{th}$ stage of shift register unit when the $(j+1)^{th}$ stage of shift register unit outputs the scan signal.

18. A gate line driving method for a gate driving circuit in which a shift delay module is arranged between the $j^{th}$ stage of shift register unit and the $(j+1)^{th}$ stage of shift register unit which are adjacent to each other, wherein j is a positive integer, comprising:

controlling a repeat output module to turn on by a clock control terminal after a touch time ends, such that the shift delay module outputs a repeat scan signal to the output terminal of the $(j-n+1)^{th}$ stage of shift register unit corresponding thereto previously through the repeat output module, wherein n is a positive integer and n is equal to or less than j; and re-outputting a scan signal to a gate line by each of the shift register units from the $(j-n+1)^{th}$ stage to the $j^{th}$ stage in sequence.

19. The method of claim 18, wherein stopping by the repeat output module the output of the repeat scan signal to the output terminal of the $(j-n+1)^{th}$ stage of shift register unit after re-outputting the scan signal by the $j^{th}$ stage of shift register unit.

20. The method of claim 18, wherein stopping by the repeat output module the output of the repeat scan signal to the output terminal of the $(j-n+1)^{th}$ stage of shift register unit after the $(j+1)^{th}$ stage of shift register unit outputs the scan signal.

* * * * *